United States Patent [19]
Prussen et al.

[11] 4,371,279
[45] Feb. 1, 1983

[54] STRUCTURAL JOINT

[76] Inventors: John Prussen, 1971 Horatio Ave., Merrick, N.Y. 11566; Paul Gossen, 333 West End Ave., New York, N.Y. 10023

[21] Appl. No.: 189,175

[22] Filed: Sep. 22, 1980

[51] Int. Cl.³ .......................... B25G 3/00; F16D 1/00; F16G 11/00
[52] U.S. Cl. ........................................... 403/8; 52/81; 403/20; 403/21; 403/217; 403/356; 403/255; 403/11
[58] Field of Search ................. 403/7, 8, 11, 20, 21, 403/263, 264, 230, 217, 218, 219, 171, 172, 174, 176, 177, 189, 191, 356, 379, 255; 52/80, 81

[56] References Cited
U.S. PATENT DOCUMENTS

| | | | |
|---|---|---|---|
| 2,807,485 | 9/1957 | Seibert | 403/356 |
| 3,433,512 | 3/1969 | Kraft | 403/356 X |
| 3,632,147 | 1/1972 | Finger | 403/176 X |
| 3,982,841 | 9/1976 | Endzweig | 403/171 X |
| 4,027,449 | 6/1977 | Cilveti et al. | 403/176 X |
| 4,124,317 | 11/1978 | Dauth | 403/8 |
| 4,193,706 | 3/1980 | Eberlein et al. | 52/81 X |

Primary Examiner—Wayne L. Shedd
Attorney, Agent, or Firm—Arthur V. Smith; Pasquale A. Razzano

[57] ABSTRACT

A structural joint for a space frame having connecting members or nodes and tubular structural member is provided in which the shank of a connecting bolt, whose head is located within the hollow end portion of the tube, extends through an aperture in the tube end for engagement with a threaded opening in the node. The tube shank has a longitudinally extending keyway formed therein in which a key is slidably received. A nut or sleeve having an unthreaded inner bore receives the bolt shank and has an internal keyway which receives a portion of the key to rotatably lock the nut and bolt together so that the nut may be rotated to rotate the bolt and engage its shank in the threaded opening of the connecting member.

11 Claims, 4 Drawing Figures

STRUCTURAL JOINT

The present invention relates to a structural connecting joint, and more in particular, to a structural joint for a space frame system.

Space frame systems consist of a plurality of structural elements or chords, usually hollow tubes, arrayed in a geometric pattern with the ends of the tubes connected together at connecting joints or nodes. A variety of different types of joints have been provided for space frame systems to facilitate the connection of the tubes to the nodes. One system is commonly known as the MERO system and is available from the Unistrut Corporation. In this system, hollow tubular structural members are connected to node points or connecting elements by the use of bolts mounted in the ends of the tubes. The bolts are slidably mounted in the tube ends and are held from inadvertently falling into the tool end by a spanner sleeve pinned to the bolt. While this arrangement has been found satisfactory in use, it is relatively expensive to manufacture because of the provision of spanner sleeves or nuts having slots therein, which require special machining tools for manufacture.

It is an object of the present invention to provide an improved structural joint for a space frame system which is relatively simple and inexpensive to manufacture.

Another object of the present invention is to provide a structural joint for a space frame system which is relatively simple to erect.

A still further object of the present invention is to provide a structural joint for a space frame system which is reliable in operation.

In accordance with an aspect of the present invention, a structural joint is provided for a space frame system which utilizes hollow tubes as structural members. The tubes have closed end portions, at least one of which has an aperture formed therein. The tubes are connected by ball-like node elements having threaded openings. A bolt is mounted in the end of the tube with its head located within the tube and its threaded shank extending through the aperture to a free end which is adapted to be threadedly engaged with a threaded node opening. The shank has a keyway formed therein inwardly of its free end and a complementary key slidably received in the keyway. A nut or sleeve, having an unthreaded bore, receives the shank of the nut on the exterior of the tube and has a keyway formed in its bore for receiving the key, whereby the bolt and nut are connected for simultaneous rotation. Thus, rotation of the nut externally of the tube will cause the bolt to rotate and threadedly engage the node to form the desired connection.

The above, and other objects, features and advantages of this invention will be apparent in the following detailed description of an illustrative embodiment thereof which is to be read in connection with the accompanying drawings, wherein.

Figure 1:
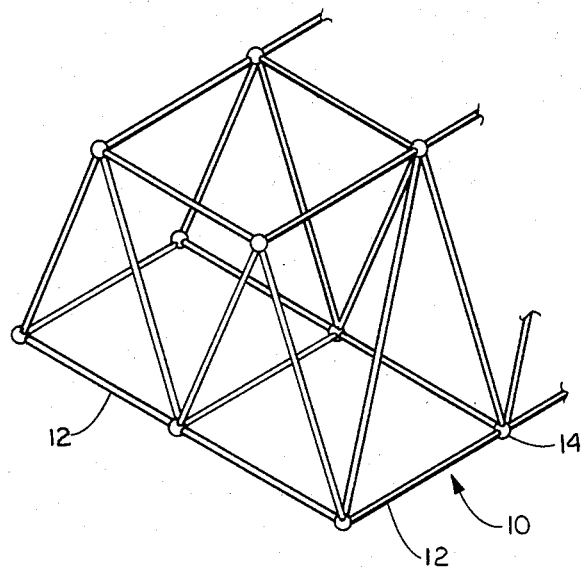
FIG. 1 is a partial perspective view of a space frame system utilizing the structural joints of the present invention.

Referring now to the drawings in detail and initially to FIG. 1 thereof, a spaced frame 10 is illustrated utilizing structural joints constructed in accordance with the present invention. The space frame consists of a plurality of structural elements or chords 12 connected at node points 14 in accordance with the geometric pattern or design for the particular space frame being erected. Space frame structures are well known in the construction industry and provide lightweight open structural elements for roofs spanning large distances.

Figure 2:
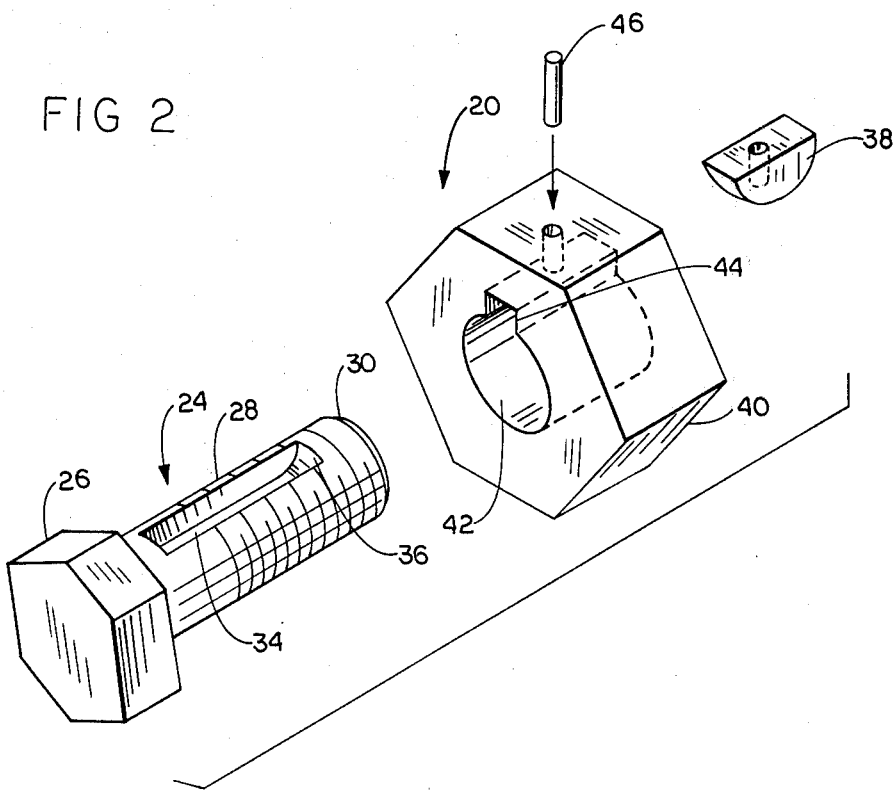
FIG. 2 is an exploded perspective view of the bolt, nut and key arrangement used in the joint of the present invention.
Figure 3:
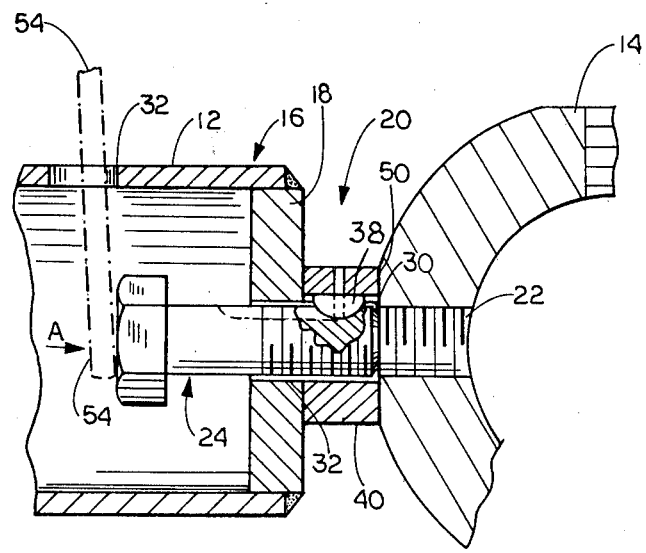
FIG. 3 is a side sectional view through the structural member and node of the joint, just prior to the engagement of the bolt in the node.
Figure 4:
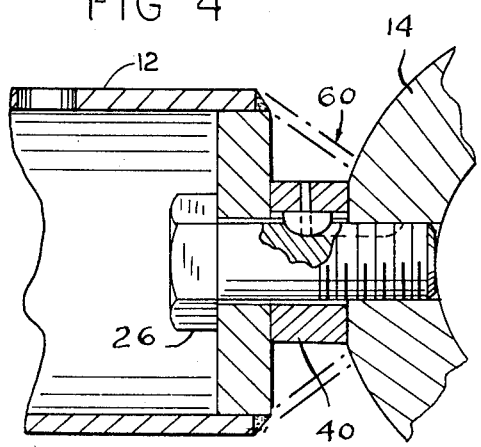
FIG. 4 is a side sectional view, similar to FIG. 3, showing the completed connection.

In the illustrated embodiment of the invention, structural elements 12 are hollow tubular members whose ends 16 (see FIG. 3) are closed by end plates 18 or the like. It will be appreciated that while only one end of tube 12 is illustrated in FIGS. 3 and 4 of the drawing, the opposite end of the tube is of identical construction. These tube ends are connected by the bolt and nut assemblies 20, shown in detail in FIG. 2, to the nodes or connecting elements 14. The latter are hollow or solid ball-like members having a plurality of threaded openings 22 formed therein. Preferably nodes 14 are spherical in shape, with a series of flat facets formed thereon.

The diameter of the openings 22 is selected to be complementary to that of the bolt in the assembly, to provide a threaded connection between the tube and the node. These openings may be equally sized and spaced for the standard node point connection, or they may have diameters of varying sizes at varying angles, in order to accommodate specific design arrangements for the space frame.

Bolt and nut assembly 20 is mounted on the end plate 18 of the tube 12. The assembly includes a bolt 24 having a head 26 and a shank 28 which extends from the head to a free end 30. The bolt is slidably received in an unthreaded aperture or opening 32 formed in plate 18. The bolt is assembled in plate 18 before the plate is welded to the open end of the tube 12.

To prevent complete retraction of the bolt into tube 12 the bolt is provided with a longitudinal keyway 34 formed in its threaded shank. As illustrated in FIG. 2, the keyway has a length which is less than the length of the shank and its end 36 is located inwardly of the free end 30 of the shank. A complementary key 38 is slidably received in keyway 34 and extends radially outwardly from shank 28.

A nut or sleeve 40 having an unthreaded internal bore 42 receives nut shank 28 on the exterior of plate 18. Sleeve 40 has a keyway 44 formed therein which receives the radially extending portion of key 38 thereby to join sleeve 40 and bolt 24. It is noted that keyway 44 in sleeve 40 extends along the entire length of the sleeve, so that it is open at both ends. This enables the sleeve to be slidably positioned over shank 28 to engage key 38.

To prevent removal of sleeve 40 from shank 28, the sleeve is pinned to key 38 by a roll pin 46 or the like. As seen in FIG. 3, pin 46 is located in sleeve 40 at a predetermined position with respect to slot 34 such that when key 38 is at the end of the slot nearest the free end 30 of shank 28, the end 30 of the bolt aligns with the outer end face 50 of sleeve 40. This arrangement is selected so that tube 12, having sleeves 40 on both of its ends, will fit between a pair of node elements 14. Typically, in the erection procedure, the node elements are in place before the tube connecting the two node elements is secured to them. Thus the overall length of the tube 12 and the sleeves at the ends thereof is limited to the space provided between facing facets on two node elements.

With the structure of the present invention the bolt is secured to the end plate 18 of tube 12 against inadvertent retraction into the tube. In order to connect the tube to the node points it is necessary to thread the bolt into the threaded openings 22 of the node points. Because the end 30 does not project beyond sleeve 40 it may be difficult to initiate threading of the bolt into the node upon simple rotation of sleeve 40. To overcome this problem an opening or aperture 52 is provided in sleeve 12 rearwardly of plate 18. This aperture permits a tool or rod 54 of any convenient construction to be inserted into the interior of the tube for engagement against nut head 26. By urging the tool 54 such that its end 56 moves in the direction of the arrow A in FIG. 3, bolt 24 will be urged to the right, so that the end 30 extends beyond the face of sleeve 40 into initial threaded engagement with opening 22. Rotation of sleeve 40 will then cause the bolt to thread into opening 22 to connect the tube to the node. Sleeve 40 is rotated by any convenient wrench and rotation is continued until a tight connection is formed between the tube and the node. If desired, a plastic seal cap, shown in dotted lines in FIG. 4, and having a longitudinal split formed therein may be snap-fit around nut 40, after the connection is completed, to form a weather seal for the nut assembly.

Of course, it will be understood that should it become necessary to disassemble the space frame, the structural joint of the present invention is readily disassembled by reverse rotation of nut 40.

Accordingly, it is seen that the present invention provides a relatively simple joint for a space frame system using a minimum of parts. Moreover, the components of the joint are of conventional construction and inexpensive to manufacture. No special technology or equipment is required to form keyways in either the bolt or the unthreaded bore of the sleeve. Thus, it is believed the system of the present invention will be materially less expensive than that of previously proposed systems.

Although an illustrative embodiment of the invention has been described herein with reference to the accompanying drawings it is to be understood that the invention is not limited to that precise embodiment, and that various other changes and modifications may be effected therein by one skilled in the art without departing from the scope or spirit of this invention.

What is claimed is:

1. A structural joint for a space frame comprising a connecting member having a threaded opening therein; a structural member having at least one hollow end portion including an aperture formed in said end portion, a connecting bolt having a head located in said hollow end portion of the structural member and a shank extending through said aperture, said shank having a free end and being threaded over a major portion of its length between said head and said free end, said shank further having a longitudinally extending keyway formed therein and extending through at least part of the threaded portion thereof, a key received in said slot, and a nut engaged with said bolt shank on the exterior of said structural member, said nut having an unthreaded circular aperture formed therein receiving said shank and an internal keyway formed on the inner surface of the aperture receiving a portion of said key, and said key being slidable in both said keyways whereby said nut may be rotated to rotate said bolt and engage the shank thereof in the threaded opening of said connecting member.

2. A structural joint as defined in claim 1 including pin means for securing said nut to said key.

3. A structural joint as defined in claim 1 wherein said structural member has an opening formed therein remote from said aperture and through which a tool may be inserted to engage said bolt head and urge said shank outwardly into threaded engagement with said threaded opening of the connecting member.

4. The structural joint as defined in claim 1 wherein said connecting member is the node of a space frame and said structural member is a hollow tube.

5. The structural joint as defined in claim 2 wherein said pin means is a roll pin.

6. The structural joint as defined in claim 1 wherein said keyway in said bolt has a length which is less than the length of said shank and is located between the ends of said shank whereby that keyway has closed ends.

7. The structural joint as defined in claim 6 wherein the keyway in said nut extends along the entire length of the nut and is opened at both ends.

8. A structural joint for a space frame comprising a hollow tube defining a structural member for the space frame, said tube having closed end portions at least one of which has an aperture formed therein, a node for the space frame having at least one threaded opening therein, a bolt mounted on said tube having a head located within the tube and a threaded shank extending from said head to a free end through said aperture for threaded engagement with said node opening; said shank having a keyway formed therein inwardly of the free end of the shank and extending through at least a portion of the threaded portion of the shank, a complementary key slidably received in said keyway and a nut having a polygonal outer surface and an unthreaded bore formed therein receiving said shank on the exterior of said tube, said nut having a keyway formed therein receiving said key, and means for securing said nut to said key whereby said bolt and nut are connected for simultaneous rotation upon rotation of the nut thereby to thread said bolt into said node.

9. A structural joint as defined in claim 8 wherein said tube has an opening formed therein remote from said aperture and through which a tool may be inserted to engage said bolt head and urge said shank outwardly into threaded engagement with said threaded opening of the node.

10. A structural joint as defined in claim 9 wherein said pin is a roll pin.

11. A structural joint as defined in claim 9 wherein the keyway in said nut extends along the entire length of the nut and is open at both ends.

* * * * *